(No Model.)
W. R. CUNNINGHAM.
BRICK MACHINE.
No. 409,348. Patented Aug. 20, 1889.
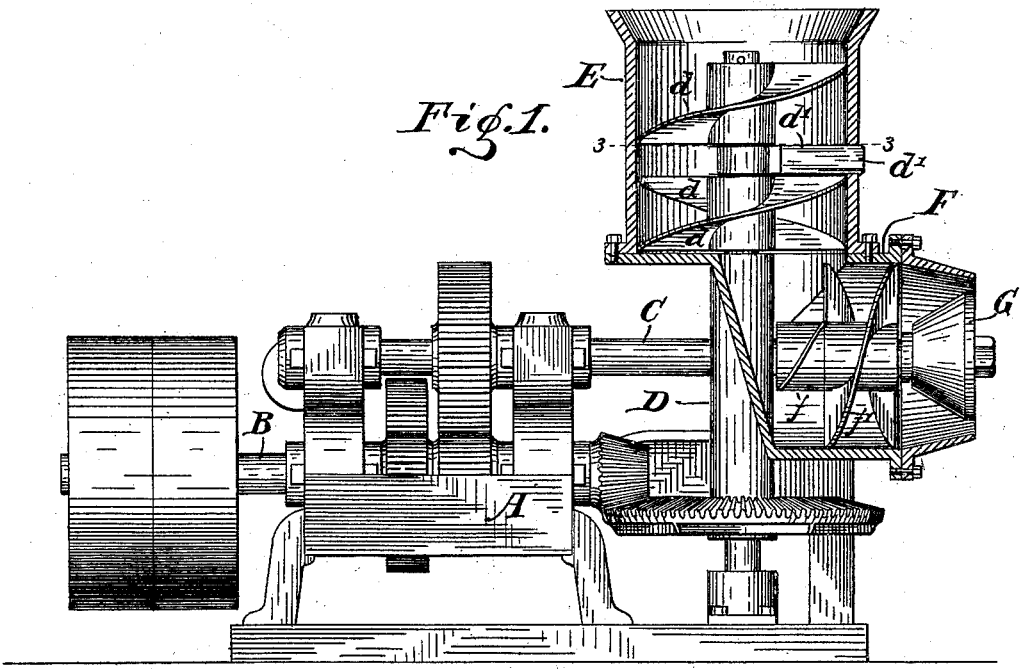
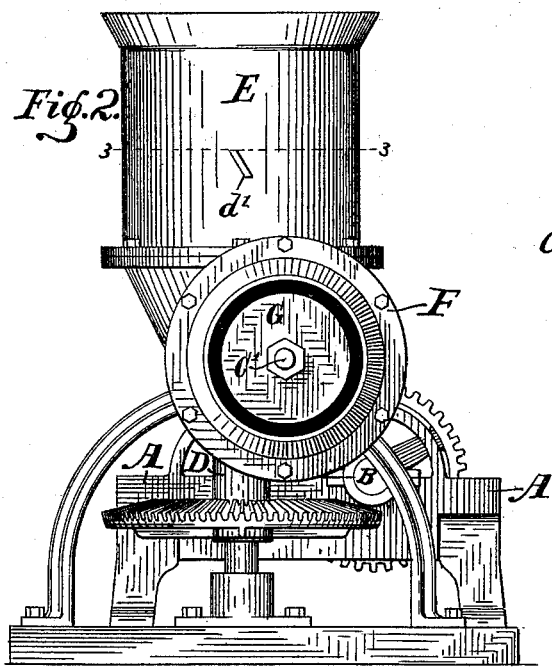
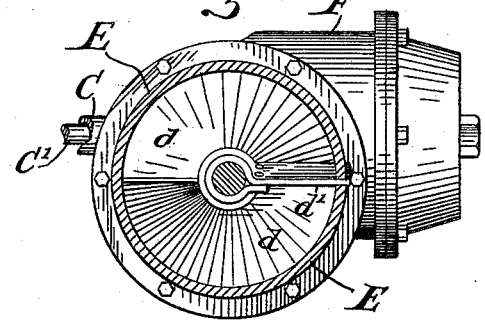
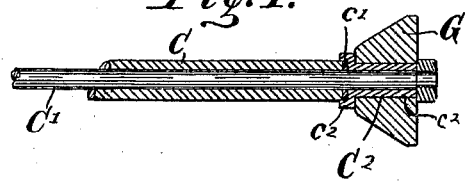
WITNESSES.
Chas. N. Leonard.
Chas. L. Thurber.
INVENTOR.
Wm. R. Cunningham,
PER C. Bradford,
ATTORNEY.

UNITED STATES PATENT OFFICE.

WILLIAM R. CUNNINGHAM, OF FRANKFORT, INDIANA, ASSIGNOR TO THE WALLACE MANUFACTURING COMPANY, OF SAME PLACE.

BRICK-MACHINE.

SPECIFICATION forming part of Letters Patent No. 409,348, dated August 20, 1889.

Application filed March 3, 1887. Serial No. 229,499. (No model.)

*To all whom it may concern:*

Be it known that I, WILLIAM R. CUNNINGHAM, of the city of Frankfort, county of Clinton, and State of Indiana, have invented certain new and useful Improvements in Clay-Working Machines, of which the following is a specification.

My invention relates to clay-working machinery, especially machines for forming terra-cotta lumber, brick, and tile.

It consists in certain improvements in the construction of the hopper through which the clay is introduced and the mechanism therein by which the much-desired object of destroying the laminations in the clay is effectually accomplished, and also in constructing said mechanism with few working parts which operate in the clay, thus reducing the liability of heating said clay to a minimum, and producing a very cheap and effectual machine of a very large capacity, as will be hereinafter fully described and claimed.

Referring to the accompanying drawings, which are made a part hereof, and on which similar letters of reference indicate similar parts, Figure 1 is a side elevation of a machine embodying my said invention, the hopper end casing of the mill being shown in section, thus permitting the mechanism to be seen; Fig. 2, a front elevation; Fig. 3, a horizontal sectional view through the hopper, looking downwardly from the dotted line 3 3; and Fig. 4, a detail sectional view through the front end of the shaft and the die mounted thereon.

In said drawings the portions marked A represent the frame-work of the machine; B, the main or driving shaft; C, the screw or auger shaft; D, the vertical auger shaft or shaft to the mechanism in the hopper or press-box; E, said hopper or press-box; F, the casing of the mill, and G the internal die used when forming the tile.

This machine, except in the features hereinafter specified, is not of my present invention, and will not therefore be particularly described herein, but only incidentally in describing my said invention. The frame-work provides bearings and supports for the shafts and other parts, and the driving-shaft drives the other shafts through appropriate gearing, as shown. The arrangement of the casing and shafts carrying the tempering and forcing screws inside of said casing, by which they are driven from beneath the mill, I consider a novel construction and have made the same the subject-matter of another application, No. 270,617, filed April 14, 1888.

The screw or auger shaft C carries the ordinary screw-shaped wings, by which the clay is forced out through the dies and formed into the desired manufacture. It also carries the double-winged tempering-blade or mud-wing *f*, which is mounted thereon directly in the rear of the screw-shaped wings *f'*. This blade is mounted directly under the discharge-opening of the vertical hopper and serves to gather and twist the clay as it comes therefrom, as will be hereinafter described. It is hollow, as usual, and through it runs a stationary rod C', upon the outer end of which is placed the internal die G.

The vertical shaft D, which extends up into the hopper, carries on its upper end several screw-shaped wings *d*, which I have shown and prefer to use as two sections of auger, one section having two wings near the bottom of the hopper and the other having a single wing near its top. Interposed between these wings or auger-sections is a stationary diagonal blade or "retarding-bar" *d'*, mounted at one end on the shaft and at the other end in the side of the casing, the mounting on the shaft being preferably made by means of a ring or collar, and in the casing by means of a slot, as indicated. This stationary blade, being formed of considerable width and mounted between these auger-sections at an angle, serves to retard the mass of clay as it is forced down from the upper section and prevent it from being revolved by said section, holding it stationary, so that the upper auger-section operates to force the clay down into this solid mass, pressing it solidly together instead of carrying it around and forcing it down in layers, as in the usual construction.

The operation of my said invention is as follows: The clay is introduced into the hopper and is first acted upon by the single-winged screw *d*, which operates to gather the clay and force it downward into the hopper. It then comes in contact with the diagonal retarding-bar $d'$, which, as before stated, holds the clay from turning with the top screw, which continues to force said clay down until a solid compact mass fills the top of the hopper. From the bottom of this mass the double-winged screw $d$ operates continually to shave off the clay, cutting across such grains as may have been formed, if any, during the process of being forced down by the top screw. It then forces it downward into the horizontal chamber beneath, and here the tempering-blade $f$ gathers it as it comes from the hopper, and, by reason of its form, gives it a complete twist, at the same time advancing it to the forcing-screw $f'$, by which it is forced through the die and formed into the desired manufacture. By this operation I temper the clay by pressure instead of by grinding, as from the time it is gathered by the single screw $d$ at the top of the hopper it is continually being forced downward until it comes into the horizontal chamber and is there further tempered by the blade $f$ and forcing-screw $f'$, as above described.

By this means, as will be readily understood, I am enabled to temper the clay very perfectly, effectually destroying the usual laminations which render the manufacture easy to split and break. I also provide a machine which, by reason of the construction at the top, operates to draw in and force down the clay instead of grinding it, will not "boil over," and will "take" a great deal of material at a very moderate speed, thus giving the machine a very large capacity, and, by reason of having but few small parts and moderate speed, avoiding any unnecessary friction in the clay and the consequent "burning" of it, which is a common fault of other machines, especially those constructed for large capacity, which usually have many parts and are run at a high rate of speed, thus rendering the manufacture brittle and easily destroyed.

I am aware that the bearing or hub for supporting the inner end of the screw-shaft of some brick-machines has been supported in position by rods or spokes running therefrom to the casing surrounding said screw-shaft, and that knives have been set in the mixing-chambers of brick-machines transversely thereof; but I do not regard this as the equivalent of the stationary retarding-bar shown herein, inasmuch as they are neither adapted by construction or arrangement to perform the function of said retarding-bar.

Having thus fully described my said invention, what I claim as new, and desire to secure by Letters Patent, is—

1. A clay-working machine comprising the casing provided with the forcing-screw and die, a hopper communicating with said casing, a revolving auger-blade gathering and forcing screw mounted in the top of said hopper, another gathering and forcing screw mounted beneath the first, and a stationary diagonally-set retarding-bar interposed between said gathering and forcing screws, substantially as set forth.

2. A clay-working machine comprising the casing, a shaft mounted therein carrying the forcing-screw, a tempering-blade mounted on said shaft behind said forcing-screw, a hopper communicating with said casing, a series of gathering and forcing screws mounted in said hopper, and a diagonally-set retarding-bar interposed between them, substantially as set forth.

3. A clay-working machine comprising the casing, the mechanism therein, the hopper communicating therewith, the shaft in said hopper, a single-winged screw mounted thereon at the top, a stationary diagonally-set retarding-bar mounted beneath said single-winged screw, and a double-winged screw mounted beneath said retarding-bar, all arranged and operating substantially as set forth.

4. In a clay-working machine, the combination of the casing, a series of screws arranged to receive the clay one from another successively, and a stationary retarding-bar diagonally set at an angle and interposed between said screws, whereby the clay is maintained in a solid mass, from which the next screw takes its supply by shaving therefrom, substantially as set forth.

In witness whereof I have hereunto set my hand and seal at Frankfort, Indiana, this 25th day of February, A. D. 1887.

WILLIAM R. CUNNINGHAM. [L. S]

In presence of—
D. COULTER,
W. H. HART.